United States Patent [19]
Grant

[11] Patent Number: 4,646,962
[45] Date of Patent: Mar. 3, 1987

[54] ROTATIONAL MEANS FOR AUTOMATIC DAMPER MEANS

[76] Inventor: Willie T. Grant, 400 S. Simms St., Lakewood, Colo. 80228

[21] Appl. No.: 782,614

[22] Filed: Oct. 1, 1985

Related U.S. Application Data

[63] Continuation-in-part of Ser. No. 541,159, Oct. 12, 1983, abandoned.

[51] Int. Cl.⁴ .............................................. F24F 7/00
[52] U.S. Cl. ...................................... 236/10; 236/49; 236/51
[58] Field of Search ............................ 236/49, 51, 10; 340/310 R, 310 A

[56] References Cited

U.S. PATENT DOCUMENTS

| 2,271,487 | 1/1942 | Nessell | 236/11 X |
| 3,939,456 | 2/1976 | Curtis et al. | 236/94 X |
| 3,972,471 | 8/1976 | Ziegler | 236/51 X |
| 4,433,719 | 2/1984 | Cherry et al. | 236/51 X |
| 4,449,664 | 5/1984 | Mithuhira et al. | 236/49 |
| 4,517,548 | 5/1985 | Masahiro et al. | 340/310 R |

Primary Examiner—William E. Wayner

[57] ABSTRACT

Damper means having rotatable closure means mounted in a housing placed in the flow stream of a heating/cooling medium to regulate and control the medium being transported through duct means of a heating/cooling device; said closure means being operated by motor means, said motor means and fuel control means of the heating/cooling device being energized by means of a coded signal of thermostatically operated generator/transmitter means, said signal being transmitted along existing wires of a structure to receiver means, said receiver means electrically connecting to said motor means and to fuel control means, demodulating said coded signal and operating said motor means and fuel control means.

1 Claim, 14 Drawing Figures

ROTATIONAL MEANS FOR AUTOMATIC DAMPER MEANS

"This is a continuation-in-part of application Ser. No. 541,159, filed Oct. 12, 1983 to be abandoned."

In patent application Ser. No. 533,936 and a later application titled Improved Remote Controls For Automatic Damper Means there is set forth a novel means for controlling automatic dampers and a fuel control device by radio frequency (RF) signals.

The present invention establishes means by which multiple damper blades mounted within the housing of automatic dampers may be rotated between open and closed positions when thermostatic means command fuel control means of heating/cooling equipment and a damper motor in combination to be energized by remote control means transmitting coded signals along existing wiring within a dwelling or other structure.

A first rotational means include a damper housing having multiple blades rotatably mounting within the housing. One of the blades, being designated as active, is secured to the rotating shaft of motor means and revolves the passive blades through interconnecting linkage means. Thus, when the damper means reside over the end of a duct of an air conditioning system, said damper means control the transmission of a heating-/cooling medium from the duct into individual rooms or spaces upon command of thermostatic means operating remote control means energizing a fuel control means and said motor means in combination.

A first alternate rotational means functions similarly to said first rotational means, but modifies the operation of the first rotational means by locating the linkage means on the opposite end of said damper blades and operating the active blade by means of a driver attaching to said motor means and linkage means.

A second alternate rotational means utilize said linkage means attaching to the end of the active and passive blades. The motor end of the active blade is engaged by restoring means and solenoid means. The solenoid means and restoring means respond to commands from thermostatic means to open or close the damper blades when the room or space needs a temperature revision.

It is the primary object of the present invention to provide simple, economical rotational means for opening and closing damper blades of automatic damper means.

This and other objects and advantages of the present invention will become apparent after considering the following detailed specification and the several views of the drawings wherein:

FIG. 13 shows a first transmitter circuit;

FIG. 14 shows a second transmitter circuit.

Figure 1:
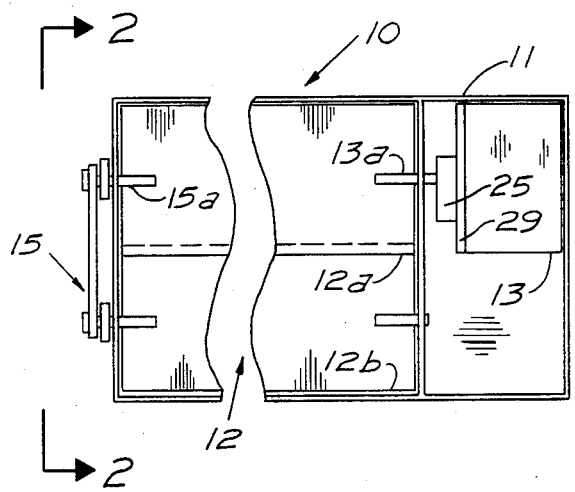
FIG. 1 is a partial plan view of automatic damper means having first rotational means.

Making reference to the drawings by identification numbers, the number 10 of FIG. 1 refers to automatic damper means having first rotational means. Damper means 10 comprise a housing 11 compartmentalized to support a plurality of rotatable damper blades in a first compartment and house motor means 13 in a second compartment; a grille 14 (FIG. 2) spanning the top of the housing, linkage means 15 (FIGS. 1 and 2) and interconnected damper blades 12.

Automatic damper means 10 reside in a floor, wall, or ceiling opening over the outlet of a heating/cooling duct that is part of a central heating and/or air conditioning system; said damper means having the function of controlling and regulating a flow medium traveling through the duct to a specific room or zone.

When it is required that the room or zone temperature be maintained relative to a set point temperature, switch means 22 (FIG. 9) is established at the set point temperature. As the room temperature falls below the preset limit, switch means 22 closes to energize signal generator 19. Upon being energized through switch means 22 and dc power source 18 (FIG. 9) generator 19 produces a precoded alternating or pulsating signal and outputs the signal along conductor 3, through capacitor 20 and resistor 23. Capacitor 24 and inductor 27 form a resonant circuit 103 tuned to the frequency of the signal being transmitted by generator 19. Resonant circuit 103 also forms the interface between the low voltage generator circuit and the high voltage house circuit—represented by isolation capacitors 29 and 30, fuse 28, and wall plug 31.

At the low voltage/high voltage interface the low voltage is superimposed onto the high voltage wave and enters the house wiring network via plug 31. At wall plug 32, FIG. 10, of receiver 101 for damper means 10, the signal, superimposed on the house voltage enters the circuitry of receiver 101; the high voltage circuitry comprising isolation capacitors 33 and 35 and fuse 34. The resonant circuit 104 comprised of capacitor 36 and inductor 37 passes the coded signal on to a high-pass filter 105, comprising resistor 39 and capacitor 38, while coupling the house voltage to the conductor having capacitor 35.

As the low voltage signal exits the high-pass filter 105, amplifier circuit 106 increases the signal's amplitude and transmits the signal to a narrowband band-pass filter (demodulator) 53. Only the signal which has been coded to match receiver 101 of damper means 10 emerges from filter 53 through resistor 54 and capacitor 55 sufficiently strong to charge capacitor 58 with a DC voltage capable of operating relay 60 through transistor 90. Diodes 56 and 57 convert the coded signal into a DC voltage to be stored on capacitor 58. Resistor 59 works in combination with capacitor 58 to form an RC time constant that will control the discharging of capacitor 58 and the closing of damper means 10 after switch means 22 of FIG. 9 opens.

Figure 10:
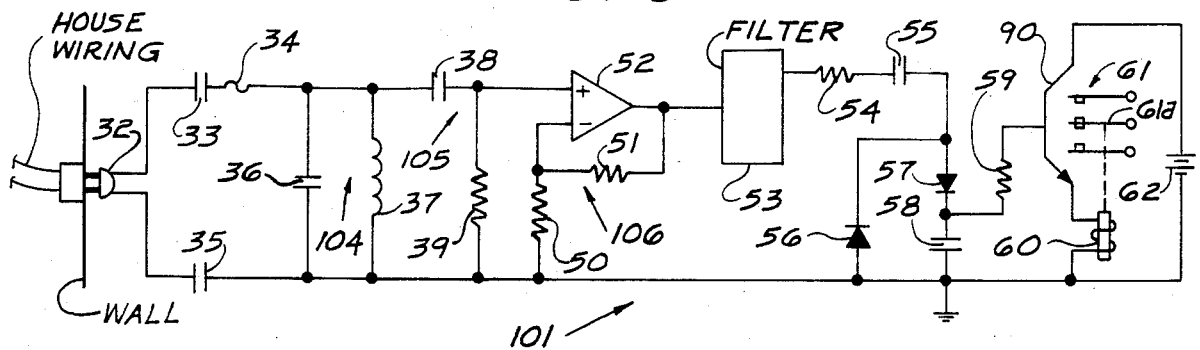
FIG. 10 is a schematic circuit diagram for the damper receiver means.
Figure 11:
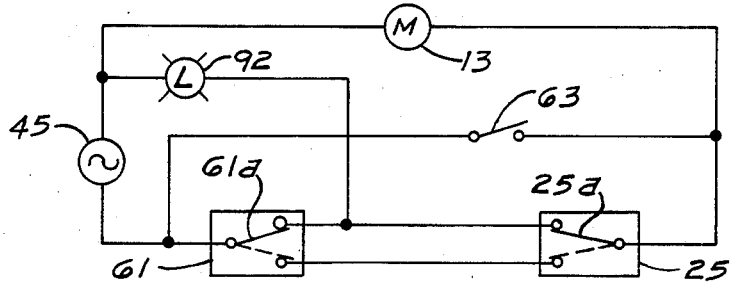
FIG. 11 shows the schematic diagram for the damper motor power circuit for the first rotational means.

FIG. 11 shows the power circuit that operates motor means 13 which opens and closes damper blades or closure means 12. As previously stated the coded signal is converted into a DC voltage, stored on capacitor 58 of FIG. 10 to operate contacts of relay 60. When contact lever 61a (FIG. 11) is in the solid line position and switch lever 25a is concurrently in the solid line position, motor means 13 is energized by AC supply 45 through the resulting closed circuit. Upon being energized motor means 13 (FIG. 1) rotates motor shaft 13a and active blade 12a (active blade 12a being secured to shaft 13a). As active 12a is rotated to an open position, passive blade 12b, being interconnected to blade 12a by rotatable linkage means 15 follows in tandem fashion. Linkage means 15 comprise multiple combinations of rotor pins and rotors secured tightly together to prevent relative rotation between each pin and rotor; and a connector plate 15b interconnecting the active blade to the passive blade.

Figures 7, 8:
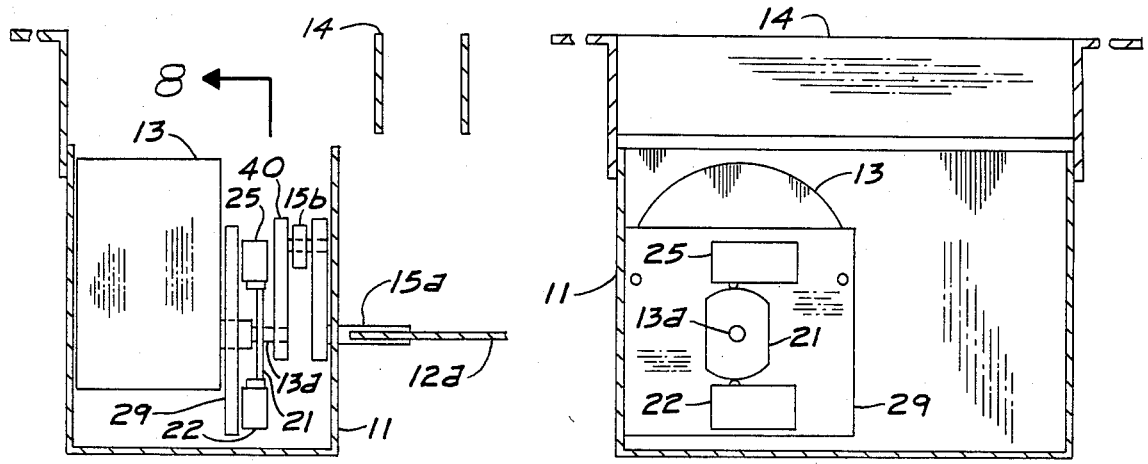
FIG. 7 is a partial cross-sectional view taken along line 7—7 of FIG. 4.
FIG. 8 is a cross-sectional view taken along line 8—8 of FIG. 7.

When the blades reach the open position, cam 21 of FIG. 8 moves switch lever 25a to the dashed line position, while contact lever 61a is held in the solid line position by the still energized relay 60. Thus, motor means 13 is deenergized and damper blades 12 remain in an open position until switch means 22 opens and deenergizes generator 19 to terminate the coded signal.

With no signal being input to receiver 101 of FIG. 10, capacitor 58 discharges through resistor 59 for a time period equal to the time constant and relay 60 continues to hold contact lever 61a in the solid line position for the duration of the time period. At the end of the time period relay 60 deenergizes and releases contact lever 61a to the dashed line position (FIG. 11), wherein a closed circuit forms with switch lever 61a, also in the dashed line position as previously explained. Motor means 13 rotates the closure means to the closed position, whereupon switch lever 61a is moved to the solid line position and motor means 13 is deenergized until a repeat cycle occurs.

Figure 12:
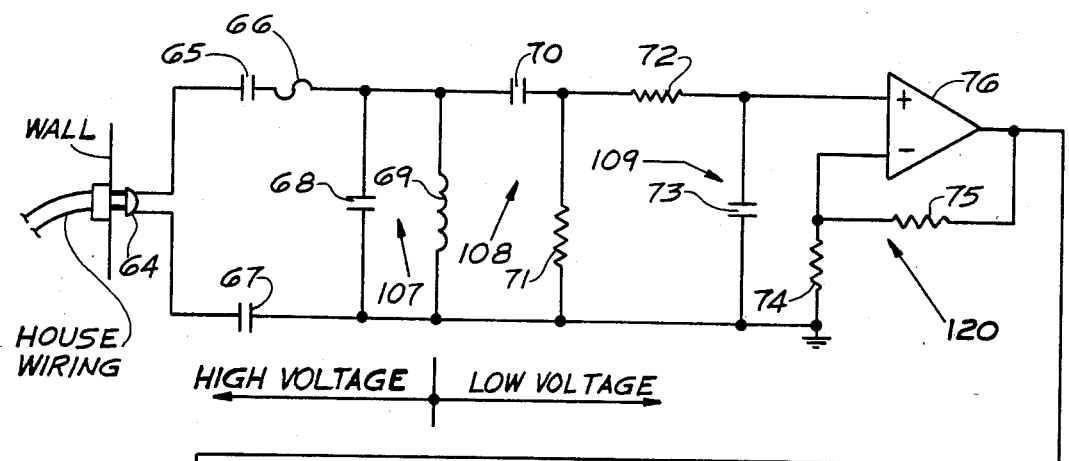
FIG. 12 shows schematic circuit diagram for the furnace receiver means.
Figure 12:
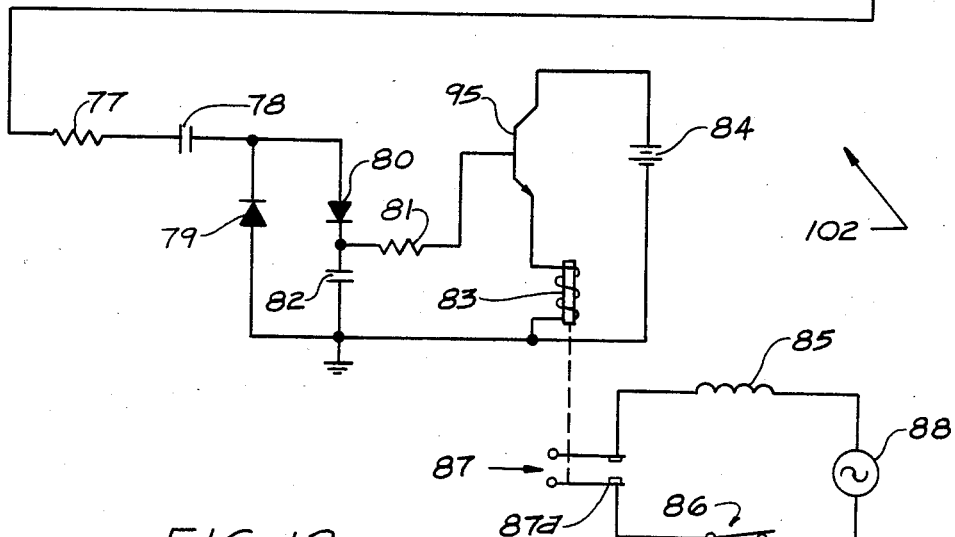

FIG. 12 shows the fuel control means receiver circuitry 102 which functions similarly to the damper receiver circuitry. In fact the two circuits are identical from the wall plug 64 to high-pass filter 108. In circuit 102 a low-pass filter 109 is added between filter 108 and amplifier 120 (amplifier 120 being comprised of resistors 74 and 75 and operational amplifier 76), the two filters creating a wide-band band-pass filter which will pass those frequencies which are used to operate the multiplicity of dampers within the building being heated/cooled by the controlling heating/cooling device. Those frequencies which are passed by filters 108 and 109 are amplified by means of amplifier 120, transmitted through resistor 77 and capacitor 78, converted to DC voltage by diodes 79 and 80 to be stored on capacitor 82. From capacitor 82 the DC voltage is used to operate relay 83 having contacts 87. When relay 83 is energized by capacitor 82 through resistor 81 and transistor 95, contacts 87 close to energize fuel control means 85 through voltage source 88 and normally closed manual switch 86. Upon termination of the coded signal when switch means 22 opens (FIG. 9), capacitor 82 discharges and releases relay means 83 to deenergize fuel control means 85.

Figure 13:
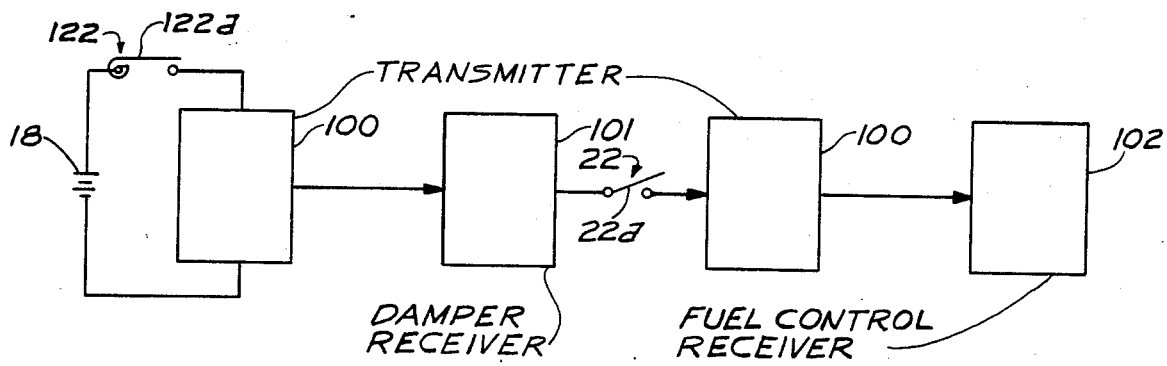
FIG. 13 shows a block diagram for a damper means using two transmitters.

Additional features of the circuit make for safety and convenience of operation. By using two transmitters per room or space as shown in FIG. 13 operation of the fuel control means can be made dependent upon the operation of motor means 13 as will be described. One aforesaid transmitter 100 is wall mounted in the typical fashion of a wall thermostat, and switch means 122 operates by means of changes in the environmental temperature. When switch means 122 closes, a coded signal will be sent to the damper receiver 101 (FIGS. 10 and 13) as previously described. The signal will be demodulated and operate motor means 13 in the precise manner heretofore stated and cam means 21 will operate switch means 22 of a second transmitter 100 in addition to the operation of switch means 25. The coded signal transmitted by the second transmitter 100 will be received by fuel control means receiver 102 and operate said fuel control means as previously explained. Manually operated switch 63 provides for a manual override of automatic switch means to operate motor means 13, and manual switch 86 allows for a power shutoff to the fuel control means. In a system having a plurality of transmitter means controlling a single heating/cooling device, light means 92 provides an indicator for the transmitter means presently energizing the heating/cooling device.

Figure 3:
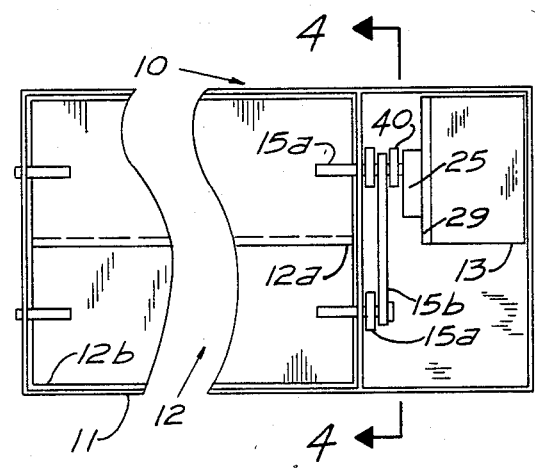
FIG. 3 is a partial plan view of automatic dampers having first alternate rotational means.
Figure 4:
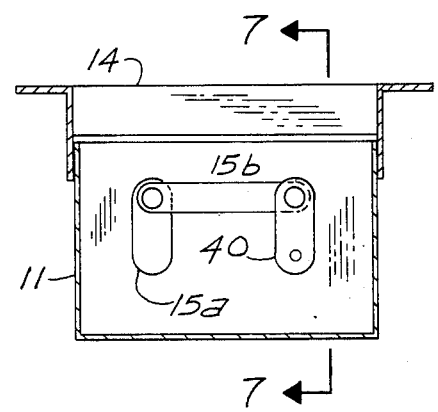
FIG. 4 is a cross-sectional view taken along line 4—4 of FIG. 3.

The first alternate rotational means perform identically to the first rotational means, with the exception of the linkage means 15. As shown in FIGS. 3, 4 and 7, shaft 13a of motor means 13 is disengaged from the direct connection to active blade 12a and replaced by linkage means component 15a. Motor shaft 13a is secured to driver 40, said driver also connecting to linkage components 15a and 15b (FIG. 7). Thus, when motor means 13 rotate, driver 40 revolves with shaft 13a to transfer the motor rotation to the damper blades through linkage means 15. This arrangement of the linkage means and motor means permits the linkage means to be functionally located within the motor compartment and still perform a 360 degree revolution.

In the foregoing description of the operation of the first rotational means and the first alternate rotational means, motor means 13 comprise a synchronous type motor having a rotating shaft. The second alternate rotational means include linear and rotary solenoid means for rotating the damper blades to an open position and linear and torsional spring action providing the restoring force to close the damper blades—linear acting solenoids having a linear spring and rotary solenoids having torsional springs.

Figure 2:
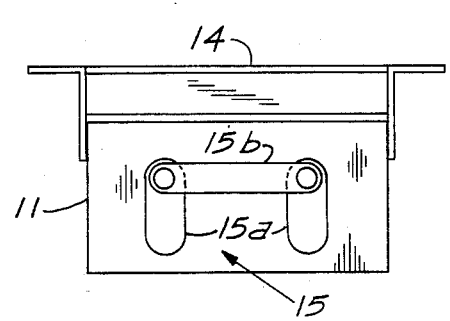
FIG. 2 is an elevational view taken along line 2—2 of FIGS. 1 and 5.
Figure 5:
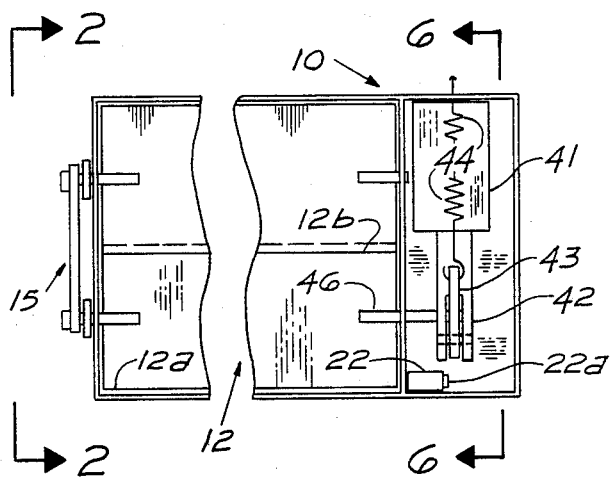
FIG. 5 is a partial plan view of automatic damper means having second alternate rotational means.
Figure 6:
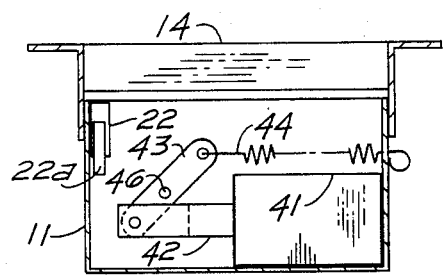
FIG. 6 is a cross-sectional view taken along line 6—6 of FIG. 5.
Figure 9:
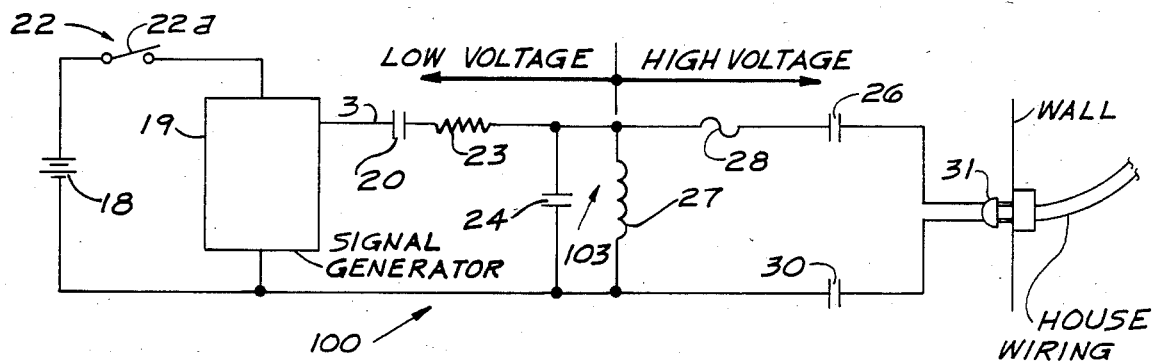
FIG. 9 is a schematic circuit diagram for the transmitter.
Figure 14:
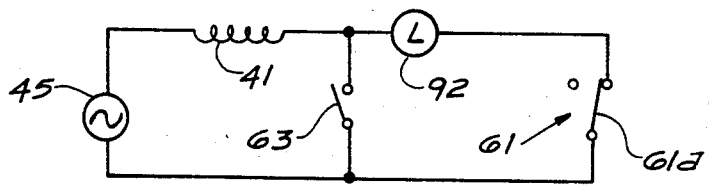
FIG. 14 is a circuit diagram for operation of solenoid motor means.

In FIGS. 5 and 6 plunger 42 of linear solenoid 41 is pivotally connected to one end of damper rotator 43, and restoring spring 44 is connected to the opposite end of the rotator. At a location between the previously stated connections rotator 43 is fixedly secured to pin 46 which in turn is secured to active damper blade 12a. The opposite end of active blade 12a and all passive blades are pivotally interconnected by aforesaid linkage means 15 as shown in FIG. 2. Referring to FIG. 9, when switch means 22 has closes solenoid means 41 will be energized through the action of transmitter 100 and receiver 101, as previously explained, and the movement of contact lever 61a to the solid line position (FIG. 14), causing plunger 42 of FIG. 6 to be pulled to the right to pivot rotator 43 and open damper blades 12 of FIG. 5. Restoring spring 44 will be elongated in preparation for its function to restore the plunger to the initial condition when the required room temperature is reached. It will be noted that the fuel control means 85 in the system of second alternate rotational means need not be energized until switch means 22 of FIGS. 5 and 9 are closed by rotator 43, when said rotator has opened the damper blades and engaged the switch lever 22a of FIG. 6 when two transmitters are used as shown in FIG. 13.

When switch means 22 of FIG. 9 opens, transmitter 100 and receiver 101 respond as previously described, deenergizing solenoid means 41; spring 44 retracts restoring plunger 42 to its starting position through the pivoting action of rotator 43. As with the previous two systems, the second alternate rotational means can be used in a structure having a plurality of rooms or zones.

In the foregoing description, the detailed damper operation using a linear solenoid has been described. Electrically a rotary solenoid (as manufactured by Ledex, Inc.) will perform in conformance with the circuits described. Rather than providing linear movement to a plunger, a shaft is attached to a rotating face place and the energized solenoid rotates the face plate and shaft through partial revolutions. Thus, in this invention FIGS. 1 and 2 are representative of the physical connection of the rotary solenoid motor means to the damper means. When the transmitter and thereby the solenoid are deenergized by switch means 22, an internal torsional spring returns the face plate and shaft to the initial starting position, thereby urging linkage means 15 to close damper blades 12. The circuit shown in FIG. 14 having light means in series with motor means can operate either linear or rotary solenoid motor means. Because the solenoid motor means provide a partial revolution to the damper blades to open and close the closure means switch 25 of FIG. 11 is not required and only one terminal of the contacts 61 is wired into the circuit. Otherwise the structure and operation of the solenoid motor means circuit is identical to that of FIG. 11 for the synchronous motor means.

In each of the rotational means heretofore described the thermostatic means, motor means, and the fuel control means are electrically interconnected by conductors. However, FIGS. 11 through 14 show the much simpler Under normal operating conditions linear solenoids produce a metallic sound as the plunger is seated within the coil framework; and rotary solenoids produce a similar sound at the end of both the energization and deenergization cycle. Cushioning means or sound dampening means, such as resilient washers or bumpers (not shown) can be attached to the plunger and shaft to prevent each of these operators from reaching their full stop limit, thereby cushioning the action and dampening the sound.

The foregoing specification sets forth the means to simply and automatically operate a plurality of damper blades rotatably mounting in a housing. Many changes, modifications, variations and other uses and applications will become apparent to those skilled in the art after considering this specification and the accompanying drawings. All such changes, modifications, variations and other uses and applications which do not depart from the spirit and scope of the invention are deemed to be to be covered by the invention which is limited only by the claims which follow.

I claim:

1. Damper means having closure means rotatably mounting in a housing, said closure means controlling and regulating the flow of a heating/cooling medium, said heating/cooling medium being transported through duct means of a heating/cooling device, said damper means, in combination, having:

(a) control means;
    said control means having transmitter means capable of energization by cam operated switch means and temperature controlled switch means in combination with power source means; said transmitter means having coded signal generation means with connecting switch means, said generation means transmitting said coded signal from low voltage means of said transmitter means to high voltage means external to said transmitter means, said low voltage means and said high voltage means having a common interface, said interface superimposing a low voltage signal on a high voltage wave; said control means having first receiver means intercepting said coded signal, said first receiver means having a high/low voltage means interface, said high voltage means having commonality to both said first receiver means and external means, said first receiver means having coded signal amplifying means, said amplifying means being a part of said low voltage means, and coded signal demodulating means connecting to said coded signal amplifying means, said demodulating means transmitting demodulated coded signal to attaching voltage storing means of said first receiver means, said voltage storing means providing time delay means for operation of relay means, said relay means operating motor means; said control means having a second receiver means intercepting said coded signal from said transmitter means, said second receiver means having a high/low voltage means interface, said high voltage means being common to both said second receiver means and said external means, said second receiver means having coded signal amplifying means, said amplifying means connecting to said low voltage means, and signal filtering means connecting to said amplifying means, said filtering means passing said coded signal to connecting voltage storing means of said second receiver means, said voltage storing means providing for operation of relay means of said second receiver means, said relay means interconnecting said second receiver means and fuel control means of said heating/cooling device, said fuel control means being energized through said relay means;

(b) linkage means,
    said linkage means providing, in combination, restoring means and interconnecting means for said closure means, and said linkage means having connection between said closure means and said motor means; said linkage means, with said motor means, cooperating with said transmitter means and said first and second receiver means to open said closure means on said transmitted coded signal from said transmitter means and to close said closure means on discontinuance of said coded signal;

(c) operating means,
    said operating means having said motor means connecting to said closure means and rotating said closure means between open and closed positions within said damper means upon a command given by thermostatic means to said transmitter means, said motor means being energized by external power means and having rotatable cam means operating said switch means, said switch means controlling operation of both said motor means and said transmitter means, said switch means of said transmitter means being cam operated when said transmitter means controls operation of said second receiver means, said second receiver means operating said fuel control means of said heating/cooling device;

(d) ancillary means,
said ancillary means including said first transmitter means operating said first receiver means by said coded signal means and said first receiver means operating said motor means and said connecting closure means; a second transmitter means operating said second receiver means, said second receiver means operating said fuel control means; ancillary means having light means electrically connecting to said motor means and to said power source, and manual switch means operating said motor means and fuel control means.

* * * * *